Jan. 13, 1953        G. R. MAHONEY        2,625,302
FOUNTAIN DISPENSER FOR PASTE OR THE LIKE
Filed March 21, 1947
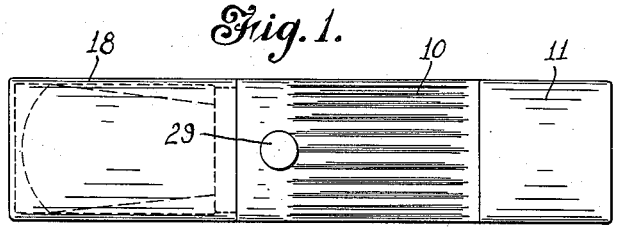
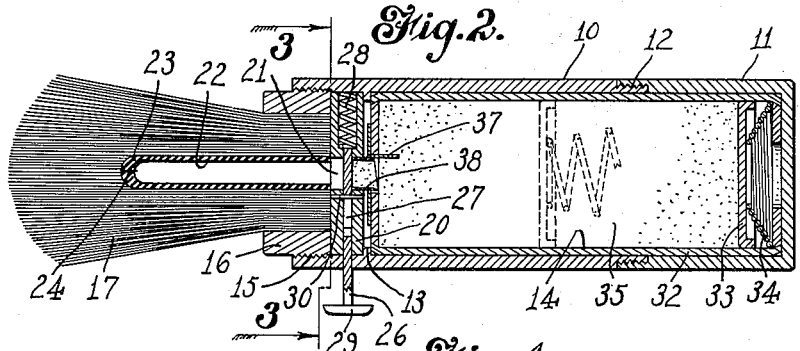
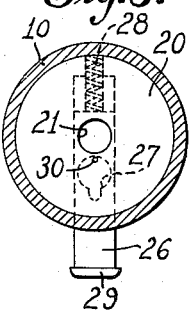
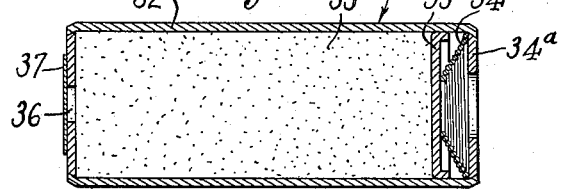
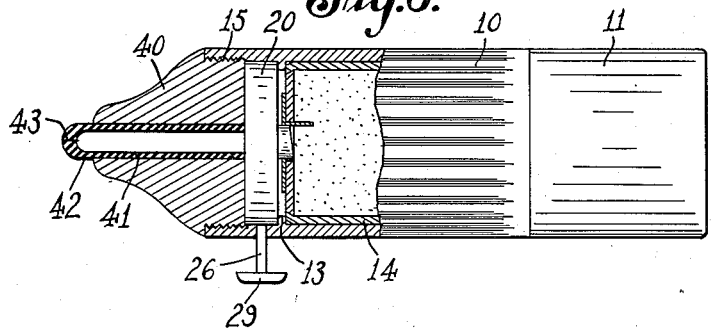
Inventor
George R. Mahoney
By Rockwell & Bartholow
Attorneys Patented Jan. 13, 1953

2,625,302

UNITED STATES PATENT OFFICE 2,625,302

FOUNTAIN DISPENSER FOR PASTE OR THE LIKE

George R. Mahoney, Tariffville, Conn.

Application March 21, 1947, Serial No. 736,263

2 Claims. (Cl. 222—82)

This invention relates to a device for dispensing material in paste form, and more particularly to a device for dispensing such material as shaving cream, toothpaste, or condiments, for example, in a convenient, sanitary and expedient manner.

As illustrated, the invention is particularly applicable to shaving cream or toothpaste in that it is shown as embodied in what may be termed a fountain shaving brush and in a holder for cream or paste, such as toothpaste. Such things as toothpaste and shaving cream are normally purchased in collapsible tubes, the tube having a screw cap which is kept closed when the contents are not being used. Very often the cap is not replaced as it should be and the paste or cream oozes from the open end of the tube with a result that the latter becomes messy and unsightly, or even unsanitary.

It is contemplated by the present invention to provide a dispensing device which is in the form of a container, so that a closed capsule containing the paste or cream may be inserted into the container and dispensed therefrom in a convenient manner. The contents of the capsule may be merely dispensed freely from the device, or may be dispensed within the bristles of a shaving brush, for example, the capsule being housed within the handle of the brush, so that the operation of applying the cream to the brush is greatly facilitated and rendered convenient and clean.

Moreover, in the present invention, I propose that the capsule or cartridge containing the cream or paste should be provided with a spring-pressed plunger normally urging the paste from the cartridge. The discharge of the paste will, however, be prevented by a readily frangible seal over the discharge opening until the cartridge is placed in the hollow handle or container of the dispensing device. When this is done, the seal will be automatically broken or severed, so that the plunger will act to effect a discharge of the contents of the cartridge under control of a manually operable valve.

One object of the invention is to provide a new and improved dispensing device for shaving cream, toothpaste or like products, so arranged that the material to be dispensed may be handled in a cleanly and convenient manner.

A further object of the invention is to provide a fountain shaving brush, the handle of the brush being arranged to receive a cartridge of shaving cream or the like, which will be automatically dispensed into the brush bristles under control of a valve mounted in the handle of the brush.

A still further object of the invention is to provide a dispensing device, such as a shaving brush, for example, having a hollow handle or container portion to receive a cartridge of shaving cream, the cartridge being provided with a spring-pressed plunger acting to force the cream through a discharge opening at the end of the cartridge, and the discharge opening being closed by a frangible seal which is automatically broken when the cartridge is inserted into the container in the handle or body of the device.

To these and other ends the invention consists in the novel features and combinations of parts to be hereinafter described and claimed.

In the accompanying drawings:

Fig. 1 is a side elevational view of a shaving brush embodying my invention;

Fig. 2 is an enlarged longitudinal sectional view of the brush with the cap or cover removed;

Fig. 3 is a transverse sectional view on line 3—3 of Fig. 2;

Fig. 4 is a longitudinal sectional view of the cartridge of paste insertable into the hollow handle or body portion of the brush; and Fig. 5 is a view partly in elevation and partly in section showing the invention applied to a dispenser for toothpaste, for example.

As shown in Figs. 1 to 4 of the drawings, the device comprises a hollow body or handle portion 10 having a cover 11, which may be threaded upon the body portion, as shown at 12.

Adjacent the forward end of the body portion 10 is an annular shoulder 13 against which may be seated a cylindrical cartridge or capsule 14 containing the shaving cream, the details of which will be described hereinafter. This cartridge is, of course, inserted after the cap 11 is removed, and is held in place upon replacement of the cap.

The body portion 10 and cap 11 may conveniently be made of plastic material, and at its forward end the body portion is internally threaded, as shown at 15, to receive the externally threaded portion of a base 16 for the brush or bristles 17, the bristles being secured to the base. It is noted that the base 16 projects beyond the body portion 10, and a cap 18 may be provided to telescope over the projecting portion of this base member so as to cover the brush, if desired. This will be found convenient when the brush is wet and it is desired to pack it in a bag or suitcase when traveling.

Between the inner end of the base 16 and the shoulder 13 is a partition member 20 fitting snugly within the body portion 10, which partition may also be made of plastic material. This partition is provided with a central opening 21 extending therethrough and communicating with a hollow tubular member 22 which extends forwardly within the brush. This tubular member is preferably made of rubber and is slightly thickened at its forward end, as shown at 23, the end being provided with a slit or opening 24 through which the shaving cream is dispensed. The opening 24 will be self-closing in that it will open due to the pressure of the cream being discharged through the tube 22, but will close automatically when the pressure is relieved.

The opening 21 in the partition 20 is controlled by a manually actuated valve. This valve comprises a flat plate-like member 26 slidably mounted in the partition 20 and provided with an opening 27 adapted to be brought into and out of registration with the opening 21. This valve member is manually held in its closed position, shown in Figs. 2 and 3, by a compression spring 28 mounted in the partition member 20, and the valve member is provided with a pushbutton 29 on its outer end by which it may be manipulated. The valve is held from complete detachment by a pin 30 driven through the partition member 20 and positioned in the valve opening 27, so that the valve member will be permitted a range of movement necessary to effect registration of the valve opening 27 with the opening 21 when it is pressed inwardly by pressure upon the button 29. When this pressure is relieved, the spring will return the valve to its closed position.

In Fig. 4 of the drawings, I have shown a form of cartridge or capsule particularly suitable for use with my dispensing device. This capsule, designated generally by the numeral 14, comprises a hollow container 32 of generally cylindrical shape. This container may be made of any desired material, such as plastic, for example, or a relatively stiff oiled paper. Within the cartridge is slidably mounted a plunger 33 urged toward one end of the cartridge or toward the left, as shown in Fig. 4, by a tapered spring 34, so that the plunger constantly exerts pressure upon the cream 35 within the cartridge. At its forward end, the cartridge is provided with a discharge opening 36 normally closed by a seal 37, which will preferably be of light material, such as pressure-sensitive tape, for example, or merely gummed paper. It is contemplated that the paste will be purchased in the cartridge, as shown in Fig. 4, and, while the plunger 33 and spring 34 will be a part of the assembly as purchased, the contents of the cartridge will be prevented from being discharged by the seal 37. The spring 34 reacts against the cap or abutment 34ᵃ at the rear end of the cartridge.

It is also contemplated that the purchaser of a cartridge 14 of paste will remove the cap 11 from the handle or body portion of the shaving brush and insert the cartridge bodily therein. At the forward end of the hollow portion of the body 10, and projecting rearwardly from the partition 20, is a hollow cylindrical member 38, the free end of which is relatively sharp. This member is provided in the opening 21 and forms a continuation of this opening. It is noted that the free edge is cut on a slight incline with respect to the axis of the member, so that one edge of this cylindrical member will first come in contact with the portion of the seal 37 which is over the opening 36 and puncture the seal when the cartridge is inserted as far as possible into the body 10 of the brush. Thus the cartridge will be completely sealed until it reaches a point at which the contents, if discharged through the opening 36 by the plunger 33, will be under control of the valve 26, and when completely inserted into the handle of the brush the seal 37 will be automatically broken and the device will be ready for use.

A slight inward pressure upon the button 29 will cause the cream to be discharged through the tube 22 into the bristles of the brush, and the amount of the cream so discharged can readily be regulated either by the effective size of the opening 21 uncovered by the valve 26 or by the duration of time that the valve is held inwardly. When the supply of cream has been exhausted, the user, by unscrewing the cap 11, may remove the cartridge from the body 10 and insert a new cartridge with a fresh supply of cream therein. The new cartridge will, of course, contain the spring 34 and plunger 33 as before.

In Fig. 5 of the drawings, I have shown the principles of my invention as applied to a dispenser for toothpaste, for example. In this case, the structure is precisely the same as that already described, with the exception of the parts at the forward or discharge end of the dispenser. In this instance, the internally threaded portion 15 of the body portion 10 is adapted to receive the externally threaded end of a dispenser head 40, this head having an opening 41 therethrough in which is positioned a hollow rubber tube 42, this tube being provided with a self-closing slit or opening 43 at its end. The valve 26 and partition 20 are provided as before, and a cartridge 14, containing the toothpaste, together with the spring 33 and plunger 34, is inserted into the body of the dispenser as previously explained.

When it is desired to use paste from the tube, the valve 26 is pressed inwardly and a supply of paste will be delivered through the opening 43, the closing of this opening causing the stream of paste to be severed and the slug of paste to be deposited upon the toothbrush.

While I have shown and described some preferred embodiments of my invention, it will be understood that it is not to be limited to all of the details shown, but is capable of modification and variation within the spirit of the invention and within the scope of the claims.

What I claim is:

1. A device for dispensing material in paste or cream form, said device comprising a hollow body, a partition member adjacent one end of the body having an opening therethrough, a valve member slidably mounted in said partition member to move transversely across said opening and having an opening therein adapted to be brought into registration with said partition opening, a paste-containing cartridge insertable as a unit in said body upon one side of the partition member, said cartridge having relatively rigid walls and an abutment at one end, a plunger in the cartridge exerting pressure on the material therein and a spring disposed wholly within said cartridge and reacting between the abutment and the plunger, said cartridge having a discharge opening at its other end registering with the opening in said partition member, a sealing member for said discharge opening, means carried by said partition member to puncture said sealing member, and a tubular dispensing member detachably secured to the body at the other side of the partition member.

2. A device for dispensing material in paste or like form, said device comprising a hollow body having a discharge tube leading therefrom and detachably connected thereto adjacent one end thereof, a cartridge insertable as a unit in said body and having a discharge opening at one end adapted to communicate with said tube, said cartridge relatively rigid walls and a frangible sealing member covering said discharge opening, penetrating means within said hollow body to pierce said frangible member, a valve to control the discharge of the material of the cartridge through said tube, a plunger in said cartridge, an abutment adjacent the other end of the cartridge, and a spring disposed wholly within said cartridge and reacting between the abutment and plunger to force the material through the discharge opening.

GEORGE R. MAHONEY.

REFERENCES CITED

The following references are of record in the file of this patent:

UNITED STATES PATENTS

| Number | Name | Date |
|---|---|---|
| 849,110 | Erickson | Apr. 2, 1907 |
| 1,220,020 | Smith | Mar. 20, 1917 |
| 1,504,001 | Soyez | Aug. 5, 1924 |
| 1,601,467 | Brownworth | Sept. 28, 1926 |
| 1,674,972 | Kendrick et al. | June 26, 1928 |
| 1,919,887 | Gleeson | July 25, 1933 |
| 1,941,140 | Dodge | Dec. 26, 1933 |
| 1,987,719 | Tear | Feb. 5, 1935 |
| 2,198,773 | Hollenbeck | Apr. 30, 1940 |
| 2,294,813 | Taube | Sept. 1, 1942 |